UNITED STATES PATENT OFFICE.

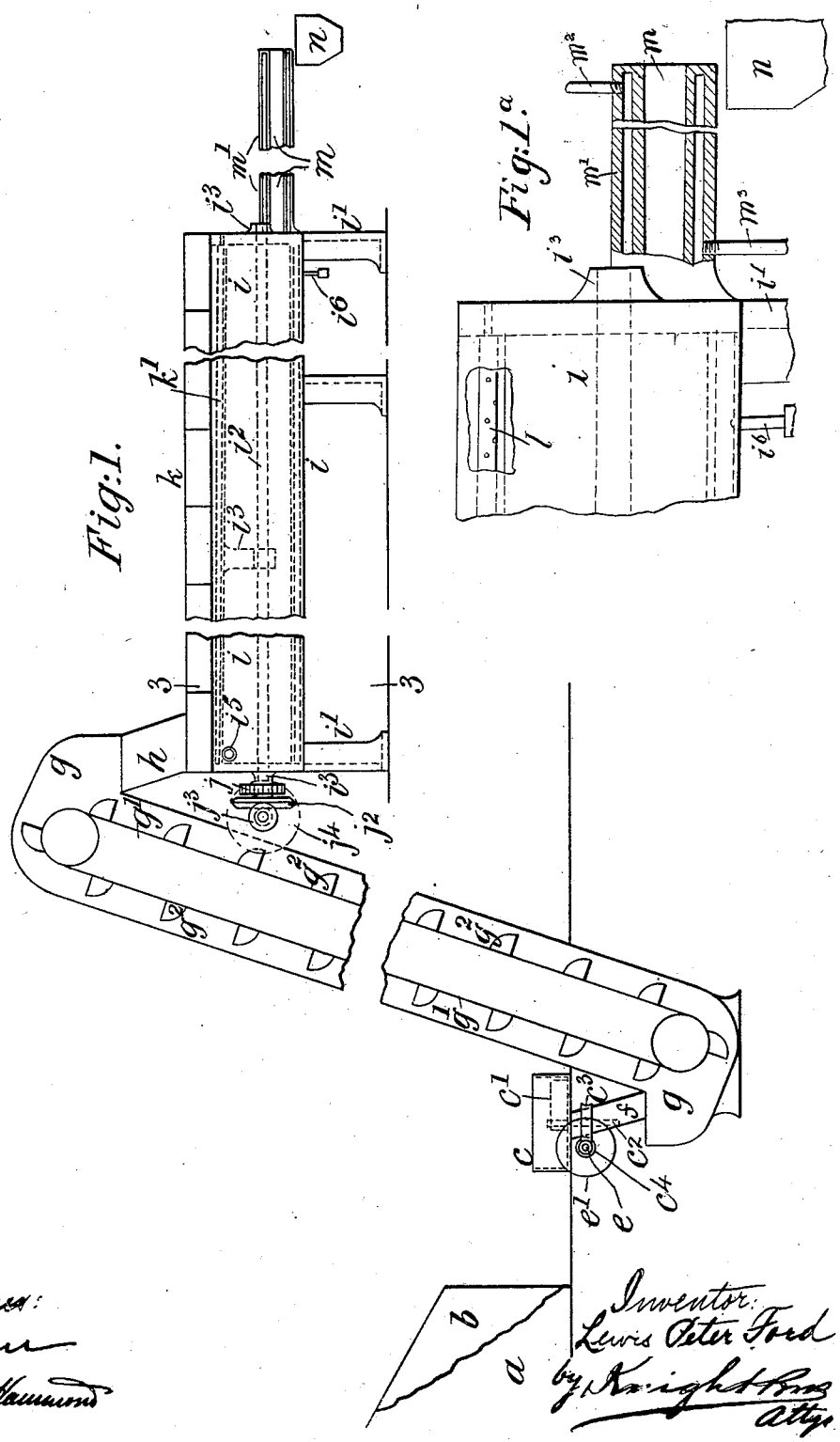

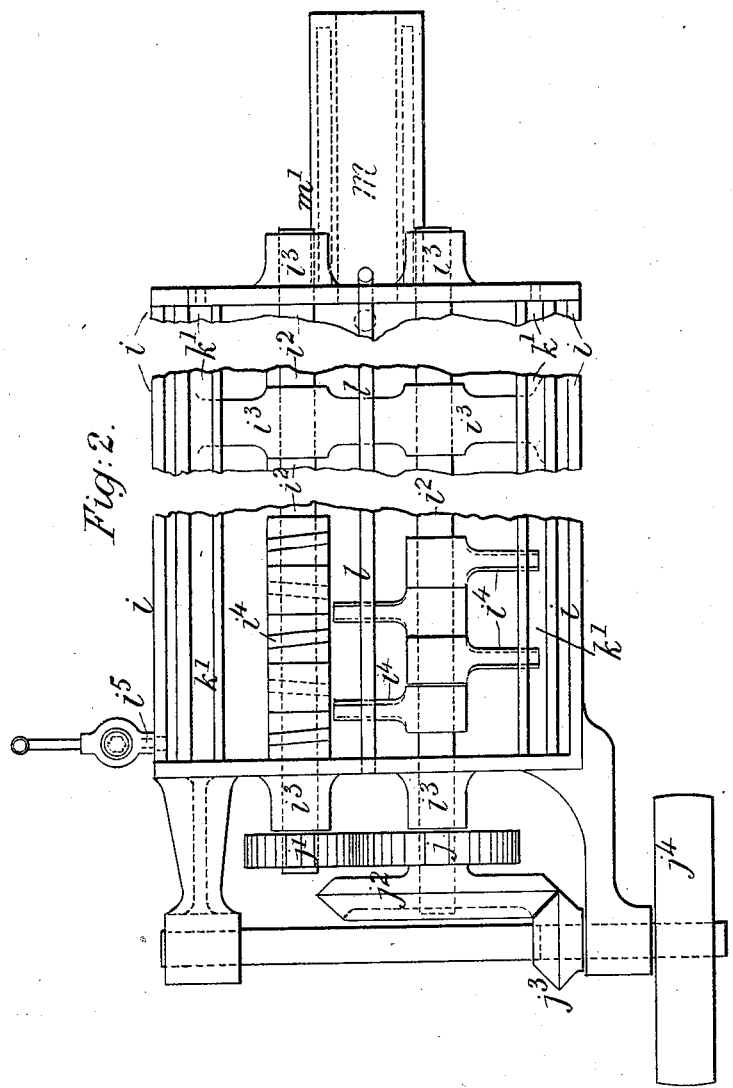

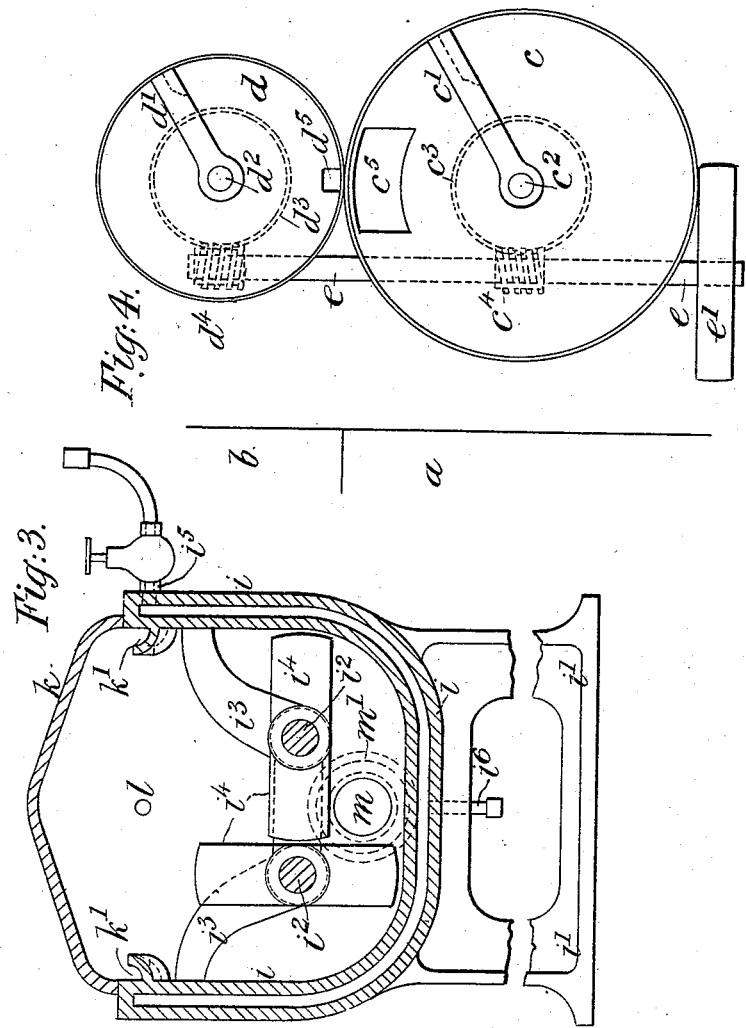

LEWIS P. FORD, OF GRESFORD, ENGLAND.

APPARATUS FOR PREPARING COMPOSITION FOR ARTIFICIAL STONE, BRICKS, &c.

SPECIFICATION forming part of Letters Patent No. 725,693, dated April 21, 1903.

Application filed November 3, 1902. Serial No. 129,894. (No model.)

*To all whom it may concern:*

Be it known that I, LEWIS PETER FORD, a subject of the King of Great Britain, residing at Gresford, in the county of Denbigh, England, have invented certain new and useful Improvements in Apparatus for Preparing Composition for Artificial Stone, Bricks, and the Like, of which the following is a full, clear, and exact description.

I will describe my invention by the aid of the accompanying drawings, in which—

Figure 1 is an elevation, partly in section, of the complete apparatus. Fig. $1^a$ is an enlarged detail view of the forward end thereof, showing the cooling-jacket and a portion of the perforated water-pipe. Fig. 2 is a plan with the cover removed, and Fig. 3 is a vertical section drawn on the line 3 3 of Fig. 1. Fig. 4 is a plan, to an enlarged scale, of the apparatus for measuring and supplying the materials.

$a$ is the store for the sand, and $b$ is the store for the lime. In close proximity to these stores I arrange the apparatus for measuring and supplying the sand and lime in measured quantities. This preferably consists, as shown in the drawings, of two cylinders $c$ and $d$, having open tops into which the materials are thrown by hand. Each of the cylinders has, respectively, a radial arm $c'$ and $d'$, mounted on vertical axes $c^2$ and $d^2$, on which are keyed worm-wheels $c^3 d^3$, gearing with worms $c^4 d^4$, fixed on a shaft $e$, provided with a driving-pulley $e'$. Each cylinder is provided with an aperture in its bottom $c^5 d^5$, through which the materials are wiped by the respective arms $c'$ and $d'$. The materials fall through the holes $c^5 d^5$ through a chute $f$ (see Fig. 1) into the lower portion of an elevator $g$, having an endless chain $g'$ and buckets $g^2$, which deliver the materials into a hopper or chute $h$, preferably provided with an automatic valve, through which the materials fall into the mixer.

The mixer consists of a hollow high-pressure steam jacket or casing $i$, which is mounted on suitable supports $i'$ and provided, as usual, with a shaft or shafts $i^2$, running in suitable bearings $i^3$ and provided with mixing-arms $i^4$. The shafts $i^2$ are geared together by means of toothed wheels $j j'$, driven by bevel-wheels $j^2 j^3$ and the belt-pulley $j^4$. The upper part of the mixer is preferably covered with a domed or arched top $k$, and suitable concave ledges are located on the inside, which constitute conduits $k'$ and are attached to the upper edges of the casing $i$ to carry off any superfluous moisture collecting on the interior of the dome $k$. The mixer is also provided with an inlet $i^5$ for steam and with a steam-trap $i^6$.

In some cases it may be necessary to supply extra water to the materials in the mixer, and this latter is therefore fitted with a perforated water-pipe $l$, passing from end to end thereof.

The tubular outlet $m$ is preferably formed with a cold-water jacket $m'$, which may be provided with induction-pipe $m^2$ and eduction-pipe $m^3$.

The materials are fed by hand into the measuring apparatus, which allows predetermined quantities, according to the size of the holes $c^5 d^5$, to fall into the lower portion of the elevator $g$, whence they are raised into the mixer, where they are thorougly mixed and heated and the lime properly slaked. The materials then pass out through the cooled tubular outlet $m$ into a hopper $n$, forming part of the brick or the like press.

It is clear that other suitable forms of measuring apparatus than the one shown in the drawings may be employed, also that I may in some cases employ more than one elevator.

By this invention I do away with several large hoppers, several floors, reduce the size of the buildings required, the length of lifts and staircases, decrease the number of operations in the manufacture, and do away with all handling of the materials from the time they are thrown into the cylindrical cavities or boxes until the pressed bricks or the like are delivered by the brick machine or press, after which they are subjected to high-pressure steam in cylinders.

What I claim as my invention, and desire to secure by Letters Patent, is—

1. An apparatus for preparing composition for artificial stone bricks and the like comprising a mixer-casing in U form having a heating-jacket and provided with concave ledges located on the inside, which constitute conduits at the upper edges of the mixing-casing for carrying off superfluous moisture from within the mixing-chamber.

2. An apparatus for preparing composition for artificial stone bricks and the like comprising a mixer-casing having a heating-jacket and a tubular outlet having a cooling-jacket.

3. An apparatus for preparing composition for artificial stone bricks and the like comprising lime and sand, automatic measuring devices, an elevator for conveying the lime and sand upwardly having a shoot into which the measuring devices discharge, a mixer-casing having a heating-jacket, a hopper into which the elevator discharges, and a tubular outlet having a cooling-jacket, a shaft having stirring-arms and mounted within the mixer-casing, and means for operating the measuring devices, the elevator, and the shaft.

In witness whereof I have hereunto set my hand in the presence of two witnesses.

L. P. FORD.

Witnesses:
B. J. B. MILLS,
CLAUDE K. MILLS.